(12) United States Patent
Tsotsis

(10) Patent No.: US 8,657,990 B2
(45) Date of Patent: *Feb. 25, 2014

(54) NANOTUBE-ENHANCED INTERLAYERS FOR COMPOSITE STRUCTURES

(75) Inventor: Thomas K. Tsotsis, Orange, CA (US)

(73) Assignee: The Boeing Company, Chicago, IL (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/587,567

(22) Filed: Aug. 16, 2012

(65) Prior Publication Data

US 2014/0020825 A1    Jan. 23, 2014

Related U.S. Application Data

(63) Continuation of application No. 11/750,207, filed on May 17, 2007, now Pat. No. 8,388,795.

(51) Int. Cl.
*B32B 9/00* (2006.01)
*B32B 37/00* (2006.01)
*B29C 65/00* (2006.01)

(52) U.S. Cl.
USPC .......................................... 156/276; 156/349

(58) Field of Classification Search
USPC ....................................................... 156/276
See application file for complete search history.

(56) References Cited

U.S. PATENT DOCUMENTS

| | | | |
|---|---|---|---|
| 2,004 A | 3/1841 | Harris et al. |
| 1,504,547 A | 8/1924 | Egerton et al. |
| 1,976,257 A | 10/1934 | Harper |
| 2,292,372 A | 8/1942 | Gerlach et al. |
| 2,367,750 A | 1/1945 | Murray et al. |
| 2,387,219 A | 10/1945 | Neville |
| 2,750,629 A | 6/1956 | Baudou |
| 2,992,711 A | 7/1961 | Mitchell et al. |
| 3,071,217 A | 1/1963 | Lawrence |

(Continued)

FOREIGN PATENT DOCUMENTS

| | | |
|---|---|---|
| DE | 3040838 | 5/1982 |
| DE | 3331494 | 3/1985 |

(Continued)

OTHER PUBLICATIONS

U.S. Appl. No. 10/628,691, filed Jul. 28, 2003, Englebart.

(Continued)

*Primary Examiner* — Philip Tucker
*Assistant Examiner* — Vicki Wu
(74) *Attorney, Agent, or Firm* — Perkins Coie LLP

(57) ABSTRACT

Carbon nanotube interlayer assemblies, methods of manufacturing carbon nanotube interlayer assemblies, and methods of manufacturing composite parts with carbon nanotube interlayer assemblies are disclosed herein. In one embodiment, a method of manufacturing a composite structure in accordance with an embodiment of the invention includes producing a plurality of carbon nanotubes on one or both sides of a substrate, and attaching the substrate to a first fiber layer. The method can further include positioning a second fiber layer adjacent to the first fiber layer to position the plurality of carbon nanotubes between the first and second fiber layers. The method can additionally include infusing the first and second fiber layers with resin, and curing the resin. In one embodiment, the carbon nanotube substrate can be attached to the first fiber layer by melt-bonding. In another embodiment, the carbon nanotube substrate can be attached to the first fiber layer with stitches.

19 Claims, 7 Drawing Sheets

(56) References Cited

U.S. PATENT DOCUMENTS

| | | |
|---|---|---|
| 3,271,917 A | 9/1966 | Rubenstein |
| 3,306,797 A | 2/1967 | Boggs |
| 3,376,184 A | 4/1968 | Ritchey et al. |
| 3,452,501 A | 7/1969 | Sickler et al. |
| 3,490,983 A | 1/1970 | Lee |
| 3,507,634 A | 4/1970 | O'Driscoll |
| 3,526,558 A | 9/1970 | Beeson |
| 3,603,096 A | 9/1971 | Wells |
| 3,879,245 A | 4/1975 | Fetherston et al. |
| 3,974,313 A | 8/1976 | James |
| 3,975,363 A | 8/1976 | Jones |
| 3,976,269 A | 8/1976 | Gupta |
| 3,995,080 A | 11/1976 | Cogburn et al. |
| 4,064,534 A | 12/1977 | Chen et al. |
| 4,086,378 A | 4/1978 | Kam et al. |
| 4,132,755 A | 1/1979 | Johnson |
| 4,186,535 A | 2/1980 | Morton |
| 4,256,790 A | 3/1981 | Lackman et al. |
| 4,310,132 A | 1/1982 | Frosch et al. |
| 4,311,661 A | 1/1982 | Palmer |
| 4,331,495 A | 5/1982 | Lackman et al. |
| 4,331,723 A | 5/1982 | Hamm |
| 4,338,070 A | 7/1982 | Nava et al. |
| 4,410,577 A | 10/1983 | Palmer et al. |
| 4,416,170 A | 11/1983 | Gibson et al. |
| 4,443,401 A | 4/1984 | Turner |
| 4,448,838 A | 5/1984 | McClenahan et al. |
| 4,463,044 A | 7/1984 | McKinney |
| 4,490,958 A | 1/1985 | Lowe |
| 4,492,607 A | 1/1985 | Halcomb |
| 4,542,055 A | 9/1985 | Fitzsimmons |
| 4,546,717 A | 10/1985 | Marchesi |
| 4,548,017 A | 10/1985 | Blando |
| 4,548,859 A | 10/1985 | Kline et al. |
| 4,571,355 A | 2/1986 | Elrod |
| 4,574,029 A | 3/1986 | Murray |
| 4,608,220 A | 8/1986 | Caldwell et al. |
| 4,615,935 A | 10/1986 | Bendig et al. |
| 4,622,091 A | 11/1986 | Letterman |
| 4,631,221 A | 12/1986 | Disselbeck et al. |
| 4,693,678 A | 9/1987 | Von Volkli |
| 4,699,683 A | 10/1987 | McCowin |
| 4,715,560 A | 12/1987 | Loyek |
| 4,736,566 A | 4/1988 | Krotsch |
| 4,760,444 A | 7/1988 | Nielson et al. |
| 4,780,262 A | 10/1988 | VonVolkli |
| 4,790,898 A | 12/1988 | Woods |
| 4,811,540 A | 3/1989 | Kallies et al. |
| 4,828,202 A | 5/1989 | Jacobs et al. |
| 4,830,298 A | 5/1989 | Van Blunk |
| 4,877,471 A | 10/1989 | McCowin et al. |
| 4,902,215 A | 2/1990 | Seemann, III |
| 4,922,232 A | 5/1990 | Bosich |
| 4,933,232 A | 6/1990 | Trout et al. |
| 4,941,182 A | 7/1990 | Patel |
| 4,942,013 A | 7/1990 | Palmer et al. |
| 4,959,110 A | 9/1990 | Russell |
| 4,966,802 A | 10/1990 | Hertzberg |
| 5,024,399 A | 6/1991 | Barquet et al. |
| 5,058,497 A | 10/1991 | Bishop et al. |
| 5,086,997 A | 2/1992 | Glass |
| 5,129,813 A | 7/1992 | Shepherd |
| 5,148,588 A | 9/1992 | Prillard |
| 5,152,949 A | 10/1992 | Leoni et al. |
| 5,178,812 A | 1/1993 | Sanford et al. |
| 5,223,067 A | 6/1993 | Hamamoto et al. |
| 5,240,376 A | 8/1993 | Velicki |
| 5,242,523 A | 9/1993 | Willden et al. |
| 5,251,849 A | 10/1993 | Torres |
| 5,262,220 A | 11/1993 | Spriggs et al. |
| 5,281,388 A | 1/1994 | Palmer et al. |
| 5,286,438 A | 2/1994 | Dublinski et al. |
| 5,292,475 A | 3/1994 | Mead et al. |
| 5,297,760 A | 3/1994 | Hart-Smith |
| 5,337,647 A | 8/1994 | Roberts et al. |
| 5,366,684 A | 11/1994 | Corneau, Jr. |
| 5,384,959 A | 1/1995 | Velicki |
| 5,399,406 A | 3/1995 | Matsuo et al. |
| 5,429,326 A | 7/1995 | Garesche et al. |
| 5,439,549 A | 8/1995 | Fryc et al. |
| 5,450,147 A | 9/1995 | Dorsey-Palmateer |
| 5,464,337 A | 11/1995 | Bernardon et al. |
| 5,518,208 A | 5/1996 | Roseburg |
| 5,540,126 A | 7/1996 | Piramoon |
| 5,562,788 A | 10/1996 | Kitson et al. |
| 5,619,837 A | 4/1997 | DiSanto |
| 5,622,733 A | 4/1997 | Asher |
| 5,651,600 A | 7/1997 | Dorsey-Palmateer |
| 5,683,646 A | 11/1997 | Reiling, Jr. |
| 5,690,973 A | 11/1997 | Kindt-Larsen et al. |
| 5,700,337 A | 12/1997 | Jacobs et al. |
| 5,746,553 A | 5/1998 | Engwall |
| 5,765,329 A | 6/1998 | Huang |
| 5,772,950 A | 6/1998 | Brustad et al. |
| 5,804,276 A | 9/1998 | Jacobs et al. |
| 5,809,805 A | 9/1998 | Palmer et al. |
| 5,811,186 A | 9/1998 | Martin |
| 5,814,386 A | 9/1998 | Vasiliev et al. |
| 5,824,255 A | 10/1998 | Ross et al. |
| 5,830,305 A | 11/1998 | Andersen et al. |
| 5,871,117 A | 2/1999 | Protasov et al. |
| 5,893,534 A | 4/1999 | Watanabe |
| 5,902,535 A | 5/1999 | Burgess et al. |
| 5,915,317 A | 6/1999 | Thrash et al. |
| 5,931,107 A | 8/1999 | Thrash et al. |
| 5,951,800 A | 9/1999 | Pettit |
| 5,953,231 A | 9/1999 | Miller et al. |
| 5,954,917 A | 9/1999 | Jackson et al. |
| 5,963,660 A | 10/1999 | Koontz et al. |
| 5,979,531 A | 11/1999 | Barr et al. |
| 6,003,812 A | 12/1999 | Micale et al. |
| 6,012,883 A | 1/2000 | Engwall et al. |
| 6,013,341 A | 1/2000 | Medvedev et al. |
| 6,045,651 A | 4/2000 | Kline et al. |
| 6,051,089 A | 4/2000 | Palmer et al. |
| 6,070,831 A | 6/2000 | Vassiliev et al. |
| 6,074,716 A | 6/2000 | Tsotsis |
| 6,086,696 A | 7/2000 | Gallagher |
| 6,099,906 A | 8/2000 | Palmer et al. |
| 6,112,792 A | 9/2000 | Barr et al. |
| 6,114,012 A | 9/2000 | Amaoka et al. |
| 6,114,050 A | 9/2000 | Westre et al. |
| 6,128,545 A | 10/2000 | Miller |
| 6,129,031 A | 10/2000 | Sarh et al. |
| 6,136,237 A | 10/2000 | Straub et al. |
| 6,155,450 A | 12/2000 | Vasiliev et al. |
| 6,159,414 A | 12/2000 | Tunis, III et al. |
| 6,168,358 B1 | 1/2001 | Engwall et al. |
| 6,187,411 B1 | 2/2001 | Palmer |
| 6,190,484 B1 | 2/2001 | Appa |
| 6,198,983 B1 | 3/2001 | Thrash et al. |
| 6,205,239 B1 | 3/2001 | Lin et al. |
| 6,229,819 B1 | 5/2001 | Darland et al. |
| 6,231,941 B1 | 5/2001 | Cundiff et al. |
| 6,245,275 B1 | 6/2001 | Holsinger |
| 6,319,447 B1 | 11/2001 | Cundiff et al. |
| 6,364,250 B1 | 4/2002 | Brinck et al. |
| 6,374,750 B1 | 4/2002 | Early |
| 6,390,169 B1 | 5/2002 | Johnson |
| 6,415,581 B1 | 7/2002 | Shipman et al. |
| 6,431,837 B1 | 8/2002 | Velicki |
| 6,451,152 B1 | 9/2002 | Holmes et al. |
| 6,480,271 B1 | 11/2002 | Cloud et al. |
| 6,508,909 B1 | 1/2003 | Cerezo Pancorbo et al. |
| 6,510,961 B1 | 1/2003 | Head et al. |
| 6,511,570 B2 | 1/2003 | Matsui et al. |
| 6,558,590 B1 | 5/2003 | Stewart |
| 6,560,843 B2 | 5/2003 | Cundiff et al. |
| 6,561,478 B2 | 5/2003 | Cundiff et al. |
| 6,589,618 B2 | 7/2003 | Cundiff et al. |
| 6,613,258 B1 | 9/2003 | Maison et al. |
| 6,620,484 B1 | 9/2003 | Bolukbasi et al. |
| 6,622,974 B1 | 9/2003 | Dockter et al. |
| 6,648,273 B2 | 11/2003 | Anast |

(56) References Cited

U.S. PATENT DOCUMENTS

| | | |
|---|---|---|
| 6,663,737 B2 | 12/2003 | Hsiao et al. |
| 6,692,681 B1 | 2/2004 | Lunde |
| 6,702,911 B2 | 3/2004 | Toi et al. |
| 6,709,538 B2 | 3/2004 | George et al. |
| 6,730,184 B2 | 5/2004 | Kondo et al. |
| 6,743,504 B1 | 6/2004 | Allen et al. |
| 6,749,784 B2 | 6/2004 | Blanchon et al. |
| 6,766,984 B1 | 7/2004 | Ochoa |
| 6,779,707 B2 | 8/2004 | Dracup et al. |
| 6,786,452 B2 | 9/2004 | Yamashita et al. |
| 6,799,619 B2 | 10/2004 | Holmes et al. |
| 6,802,931 B2 | 10/2004 | Fujihira et al. |
| 6,814,822 B2 | 11/2004 | Holmes et al. |
| 6,817,574 B2 | 11/2004 | Solanille et al. |
| 6,840,750 B2 | 1/2005 | Thrash et al. |
| 6,843,953 B2 | 1/2005 | Filsinger et al. |
| 6,860,957 B2 | 3/2005 | Sana et al. |
| 6,862,989 B2 | 3/2005 | Belanger et al. |
| 6,871,684 B2 | 3/2005 | Engelbart et al. |
| 6,896,841 B2 | 5/2005 | Velicki et al. |
| 6,910,043 B2 | 6/2005 | Iivonen et al. |
| 7,025,305 B2 | 4/2006 | Folkesson et al. |
| 7,039,485 B2 | 5/2006 | Engelbart |
| 7,039,797 B2 | 5/2006 | Huang et al. |
| 7,048,024 B2 | 5/2006 | Clark et al. |
| 7,074,474 B2 | 7/2006 | Toi et al. |
| 7,080,441 B2 | 7/2006 | Braun et al. |
| 7,080,805 B2 | 7/2006 | Prichard et al. |
| 7,083,698 B2 | 8/2006 | Engwall et al. |
| 7,093,797 B2 | 8/2006 | Grether et al. |
| 7,134,629 B2 | 11/2006 | Johnson et al. |
| 7,137,182 B2 | 11/2006 | Nelson |
| 7,159,822 B2 | 1/2007 | Grantham et al. |
| 7,171,033 B2 | 1/2007 | Engelbart et al. |
| 7,193,696 B2 | 3/2007 | Engelbart et al. |
| 7,195,201 B2 | 3/2007 | Grether et al. |
| 7,228,611 B2 | 6/2007 | Anderson et al. |
| 7,236,625 B2 | 6/2007 | Engelbart et al. |
| 7,278,198 B2 | 10/2007 | Olson et al. |
| 7,282,107 B2 | 10/2007 | Johnson et al. |
| 7,289,656 B2 | 10/2007 | Engelbart et al. |
| 7,325,771 B2 | 2/2008 | Stulc et al. |
| 7,334,782 B2 | 2/2008 | Woods et al. |
| 7,407,556 B2 | 8/2008 | Oldani et al. |
| 7,503,368 B2 | 3/2009 | Chapman et al. |
| 7,527,222 B2 | 5/2009 | Biornstad et al. |
| 7,624,488 B2 | 12/2009 | Lum et al. |
| 7,662,251 B2 | 2/2010 | Salama et al. |
| 7,716,835 B2 | 5/2010 | Johnson et al. |
| 8,148,276 B2 | 4/2012 | Nejhad et al. |
| 8,388,795 B2 * | 3/2013 | Tsotsis ............ 156/276 |
| 2002/0056788 A1 | 5/2002 | Anderson et al. |
| 2002/0185785 A1 | 12/2002 | Thrash et al. |
| 2003/0190455 A1 | 10/2003 | Burgess et al. |
| 2003/0234471 A1 | 12/2003 | Kuroiwa et al. |
| 2004/0035979 A1 | 2/2004 | McCoskey et al. |
| 2004/0071870 A1 | 4/2004 | Knowles et al. |
| 2004/0135294 A1 | 7/2004 | Thrash et al. |
| 2004/0145095 A1 | 7/2004 | McCollum et al. |
| 2004/0183227 A1 | 9/2004 | Velicki et al. |
| 2004/0219855 A1 | 11/2004 | Tsotsis |
| 2004/0222080 A1 | 11/2004 | Tour et al. |
| 2004/0265536 A1 | 12/2004 | Sana et al. |
| 2005/0059309 A1 | 3/2005 | Tsotsis |
| 2005/0163965 A1 | 7/2005 | Velicki et al. |
| 2005/0176329 A1 * | 8/2005 | Olry et al. ............ 442/388 |
| 2005/0211840 A1 | 9/2005 | Grether et al. |
| 2006/0017200 A1 | 1/2006 | Cundiff et al. |
| 2006/0071817 A1 | 4/2006 | Greene |
| 2006/0118244 A1 | 6/2006 | Zaballos et al. |
| 2006/0166003 A1 | 7/2006 | Khabashesku et al. |
| 2007/0128960 A1 * | 6/2007 | Ghasemi Nejhad et al. ... 442/59 |
| 2007/0176323 A1 | 8/2007 | Jones et al. |
| 2008/0054523 A1 | 3/2008 | Hanson |
| 2008/0111026 A1 | 5/2008 | Stulc et al. |
| 2008/0246175 A1 | 10/2008 | Biornstad et al. |
| 2008/0286564 A1 | 11/2008 | Tsotsis |
| 2009/0057487 A1 | 3/2009 | Velicki et al. |
| 2009/0139641 A1 | 6/2009 | Chapman et al. |

FOREIGN PATENT DOCUMENTS

| | | |
|---|---|---|
| DE | 19536675 | 2/1997 |
| EP | 0198744 A1 | 10/1986 |
| EP | 0319797 | 6/1989 |
| EP | 0659541 | 6/1995 |
| EP | 0833146 | 4/1998 |
| EP | 1136239 | 9/2001 |
| EP | 1 149 687 | 10/2001 |
| FR | 2667013 | 3/1992 |
| FR | 2771332 | 5/1999 |
| FR | 2844472 | 3/2004 |
| GB | 2224000 A | 4/1990 |
| JP | 61169394 A | 7/1986 |
| JP | 2001310798 A | 11/2001 |
| WO | WO-9832589 A1 | 7/1998 |
| WO | WO-03035380 | 5/2003 |
| WO | WO-2004025003 | 3/2004 |
| WO | WO-2005095091 | 10/2005 |

OTHER PUBLICATIONS

U.S. Appl. No. 12/236,355, filed Sep. 23, 2008, Biornstad.

A composite Preform http://www.priorartdatabase.vom/IPCOM/000007326, 1 page, accessed Apr. 28, 1994.

Ando, Yoshinori et al., "Growing Carbon Nontubes," Materials Today, Oct. 2004, pp. 22-29, ISSN:1369 7021.

BAe 146, FLIGHT International, May 2, 1961.

Beechcraft's Composite Challange, http://www.aerotalk.com/Beach.cfm [accessed Mar. 1, 2004 ].

Brittles, P., New Development in RTM, 19th International BPF Composites Congress, BPF, Birmingham, Nov. 22-23, 1994, pp. 11-26 (8141 OA).

Business Aviation, Jun. 7, 2002, http://www.aviationnow.com/avnow/news/channel_busav.jsp?view=story&id=news/btoyo0607.xml [accessed Mar. 1, 2004].

CASA, SAMPE Journal, vol. 39, No. 1, Jan./Feb. 2003, p. 60.

CNC fiber placement used to create an all-composite fuselage; http//www.sae.org/aeromag/techinnovations/129t08.htm; available Oct. 5, 2000; 2 pgs.

Evans, Don O., "Fiber Placement", 3 pgs, Cincinnati Machine [no date available].

Fielder, L. et al., "TANGO Composite Fuselage Platform", SAMPE Journal, vol. 39, No. 1, Jan. 2003.

Garcia, E.J. et al., "Hybrid Carbon Nanotube-Composite Architectures," MTL Annual Research Report, Sep. 2006, 1 pg.

Grimshaw et al., "Advanced Technology Tape Laying for Affordable Manufacturing of Large Composite Structures," (11 Pgs); http://www.cinmach.com/tech/pdf/TapeLayingGrimshaw.pdf.

Grimshaw, "Automated Tape Laying," (6 Pgs); http://www.cinmach.com/tech/pdf/Grimshaw%20ASM%20Handbook.pdf.

Growing Carbon Nanotubes Aligned with Patters; http://www.nasatech.com/Briefs/Oct02/NPO30205.html; accessed Mar. 21, 2007, 4 pgs.

International Search Report and Written Opinion, International Application No. PCT/US2008/062386, Applicant: The Boeing Company, mailed Nov. 11, 2009, European Patent Office, 13 pages.

Musch G. et al.: "Tooing with Reinforced Elastomeric Materials" Composites Manufacturing, Butterworth Scientific, Guildford, Surrey, GB, vol. 3, No. 2, Jan. 1992, pp. 101-111 XP000300776 ISSN: 0956-7143 col. 1, paragraph 3-col. 2, paragraph 2, figures 9, 10, 16.

Premier I Feature Lighter, Stronger All-Composite Fuselage, WolfTracks, vol. 4, No. 1, http://www.cinmach.com/wolfTracks4_1/MTG_WT7.html [accessed Mar. 25, 2004].

(56) References Cited

OTHER PUBLICATIONS

Prof. J. Zhang. "Angewandte Sensorik" CH. 4 Sensoren In Der Robotik, Nov. 11, 2003, pp. 76-113, XP002327793; URL:http://tech-www.informatik.uni-hamburg.de/lehre/ws2003/voriesungen/angewandte_sensorik/vorlesung_03.pdf, retrieved on Apr. 2004, p. 89.

Raytheon Aircraft Orders Four More Fiber Cincinnati Fiber Placement System for Industry's First Composite-Fuselage Business Jets, http://www.cinmach.com/compnews/PressReleases/pr00-11.htm [accessed Mar. 25, 2004].

Raytheon Aircraft's Hawker Horizon Reaches Fuselage Milstone, Raytheon News Release; http://www.beechcraft.de/Presse/2000/100900b.htm; [accessed Jun. 26, 2004] [had been omitted from chart].

Raytheon, Mar. 2000, vol. 4, No. 2, http://www.cts.com/king/vasci/newsletter/vol42.html [accessed Mar. 1, 2004].

Rocky Moutain Composites, Filament Winding, http://www.rockymountaincomposites.com/wind_sys.html; Filament Winding, 2 pgs [accessed Feb. 28, 2004].

Sharp et al; "Material Selection/Fabrication Issues for Thermoplastic Fiber Placement", Journal of Thermosplastic Composite Materials, vol. 8; Jan. 1995, pp. 2-14.

The Barrelful of Experience, Intervia, May 1992, 2 pgs.

The Longest Carbon Nanotubes You Have Ever Seen; http://www.spacemart.com/reports/The_Longest_Carbon_You_Have_Ever_Seen_999.html; May 14, 2007; Space Mart.

Velicki et al., "Damage Arrest Design Approach Using Stitched Composites," 2nds Aircraft Structural Design Conference. The Boeing Company, Huntington Beach, Californnia. 92647-2099, 9 pages.

Wondrous World Carbon Nanotubes; http://students.chem.tue.nl/ifp03/synthesis.html; accessed Mar. 21, 2007; 23 pgs.

Woods et al. Controlled Atmospheric Pressure Resin Infusion (17 pages).

European Extended Search Report for European Patent Application No. 13165426.1, filed The Boeing Company, mailed Jul. 2, 2013, 6 pages.

\* cited by examiner

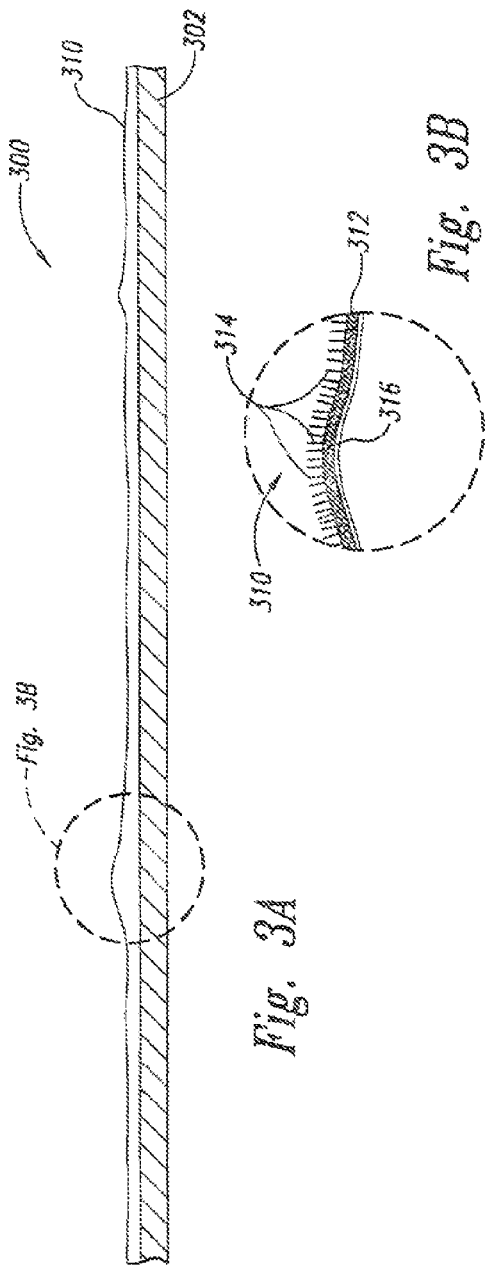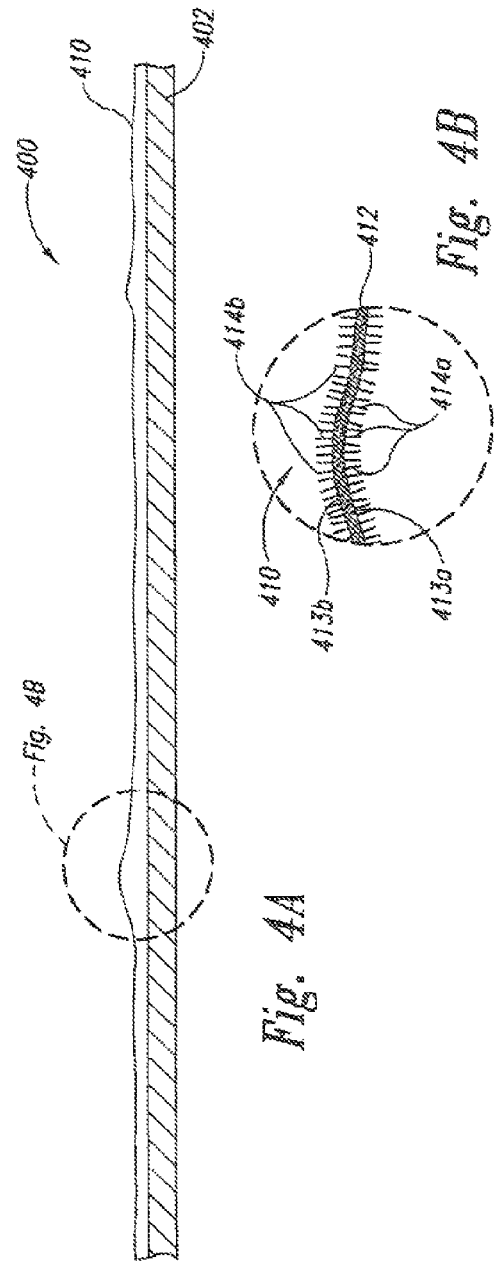

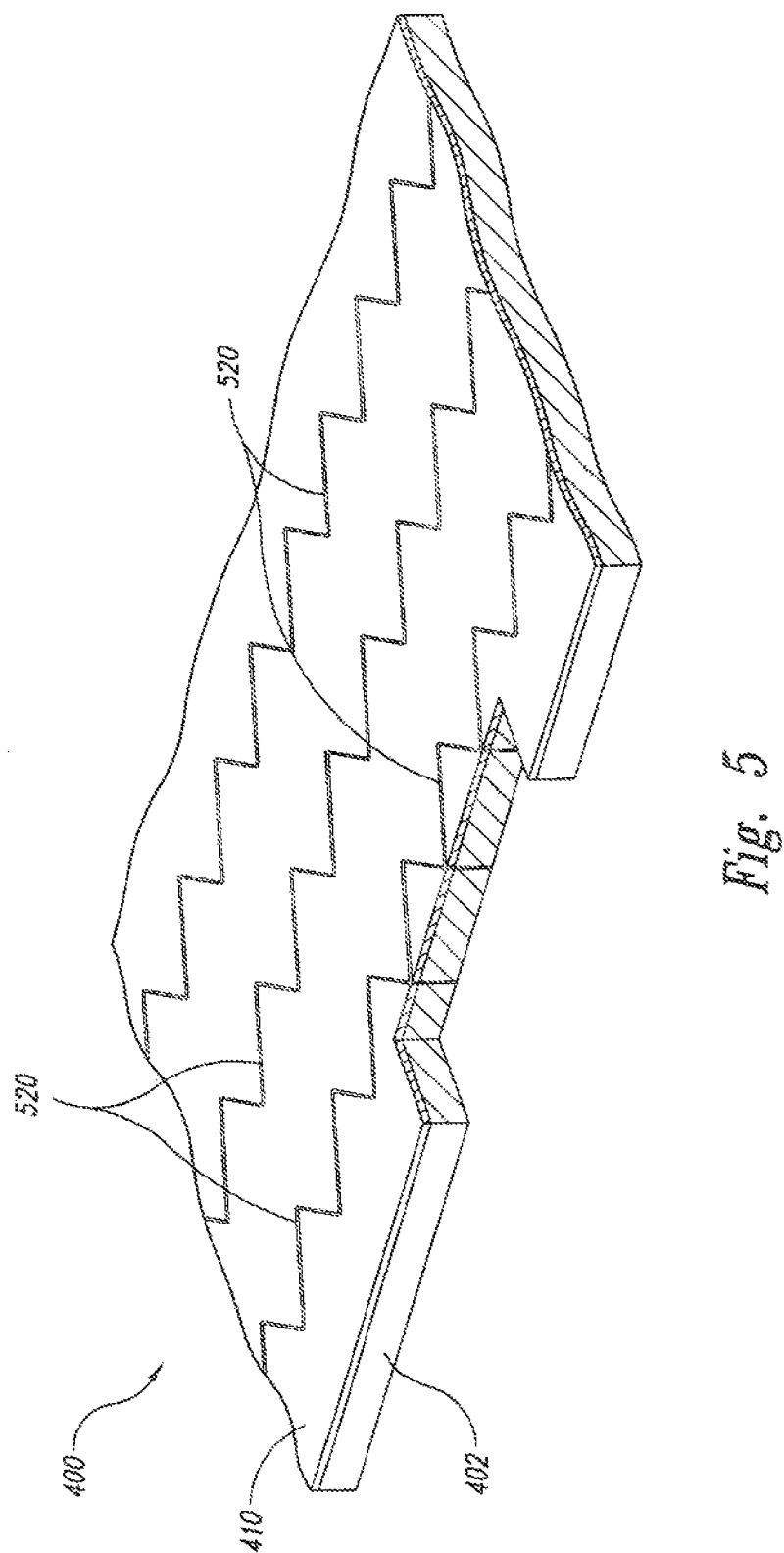

NANOTUBE-ENHANCED INTERLAYERS FOR COMPOSITE STRUCTURES

CROSS-REFERENCE TO RELATED APPLICATION

This is a continuation application of U.S. patent application Ser. No. 11/750,207, filed May 17, 2007 now U.S. Pat. No. 8,388,795, entitled NANOTUBE-ENHANCED INTERLAYERS FOR COMPOSITE STRUCTURES, which is herein incorporated by reference in its entirety.

TECHNICAL FIELD

The following disclosure relates generally to composite structures and, more particularly, to nanotube-enhanced interlayers for use in composite structures.

BACKGROUND

Fiber-reinforced resin materials, or "composite" materials as they are commonly known, are frequently used for aerospace, automotive and marine applications because of high strength-to-weight ratios, corrosion resistance, and other favorable properties. Conventional composite materials typically include glass, carbon, or polyarymide fiber "plies" in woven and/or non-woven configurations. The fiber plies can be manufactured into composite parts by laminating them together with an uncured matrix material (e.g., an epoxy resin). The laminate can then be cured with the application of heat and/or pressure to form the finished part.

Composite parts can be manufactured from "prepreg" materials, or from dry fiber plies assembled into a "preform." Prepreg is ready-to-mold material in a cloth, mat, roving, tape or other form that has been pre-impregnated with matrix material (e.g., epoxy resin) and stored for use in an uncured or semi-cured state. The prepreg sheets are laid-up on the mold surface in the shape of the finished part. Pressure is then applied to compact the prepreg sheets, and heat can be applied to complete the curing cycle. A preform is different from a prepreg assembly in that a preform is an assembly of dry fabric and/or fibers which have been prepared for a resin infusion process on the mold surface. The preform plies are usually tacked and/or stitched together or otherwise stabilized to maintain their shape before and during final processing. Once the preform has been stabilized, the layers can be infused with resin using a liquid-molding process. The part can then be cured with the addition of pressure and/or heat.

The fiber material in composite parts provides relatively high strength in the direction of the fibers. Impact resistance, however, is generally determined by the properties of the cured matrix. One way to enhance impact resistance is to add particles of, e.g., a thermoplastic material to the matrix. The thermoplastic material can inhibit crack propagation through the part resulting from, for example, foreign-object debris, which is typically not visible to the naked eye.

Another way to increase the impact resistance and fracture toughness of composite parts is to enhance the structural properties of the bond-line between alternating layers of composite materials (i.e., the interlayer properties). Adding carbon nanotubes to the interlayer is one method for improving the interlayer properties of composite materials. Carbon nanotubes are ordered molecules of pure carbon which form very small cylinders (on the order of 10 nanometers (i.e., $1\times10^{-8}$ meters)). Carbon nanotubes exhibit unusual strength, and may be over 30 times as strong as typical carbon fibers and 100 times stronger than steel of equivalent weight.

One method for introducing carbon nanotubes in between two fiber plies is to add the nanotubes to the bond-line resin. One shortcoming of this approach, however, is that it is often difficult to maintain an even distribution of nanotubes in the liquid resin. Another shortcoming with this approach is that suspending the nanotubes in resin results in random orientation of the nanotubes between adjacent fiber plies. Moreover, the addition of even small amounts of nanotubes to a liquid resin tends to dramatically increase its viscosity and, thus, decrease its processability. Accordingly, it would be advantageous to have a method for evenly distributing carbon nanotubes in the proper orientation between fiber plies in the manufacturer of composite parts.

SUMMARY

The present disclosure is directed generally toward nanotube-enhanced interlayers for composite structures. A method of manufacturing a composite structure in accordance with one aspect of the disclosure includes producing a plurality of carbon nanotubes on a substrate, and attaching the substrate to a first fiber layer. The method further includes positioning a second fiber layer adjacent to the first fiber layer to position the plurality of carbon nanotubes between the first fiber layer and the second fiber layer. The method proceeds by infusing the first and second fiber layers with resin, and curing the resin to harden the composite structure. In one embodiment of this method, the substrate is bonded to the first fiber layer to position the carbon nanotubes before resin infusion. In another embodiment, the substrate is stitched to the first fiber layer with thread. In yet another embodiment, the substrate is tacked to the first fiber layer with a tackifier.

A composite structure configured in accordance with another aspect of the invention includes an interlayer positioned between first and second fiber layers. The interlayer includes a plurality of carbon nanotubes attached to a substrate so that the nanotubes are at least generally perpendicular and evenly distributed on the substrate. The composite structure can additionally include matrix material infused into the first and second fiber layers. In one embodiment, the plurality of carbon nanotubes can include a first plurality of carbon nanotubes extending from a first side of the substrate, and a second plurality of carbon nanotubes extending from a second side of the substrate.

A system for manufacturing a composite structure in accordance with a further aspect of the disclosure includes means for producing a plurality of carbon nanotubes on a substrate, and means for attaching the substrate to a first fiber layer so that the plurality of carbon nanotubes extends away from the first fiber layer. The system can further include means for positioning a second fiber layer over the substrate to position the plurality of carbon nanotubes between the first fiber layer and the second fiber layer. The system can additionally include means for infusing the substrate and the first and second fiber layers with resin, and means for curing the resin.

BRIEF DESCRIPTION OF THE DRAWINGS

FIG. 3A is a cross-sectional side view of a carbon nanotube-enhanced interlayer attached to a fiber layer in accordance with an embodiment of the disclosure, and FIG. 3B is an enlarged, cross-sectional side view of the carbon nanotube-enhanced interlayer of FIG. 3A.

FIG. 4A is a cross-sectional side view of a carbon nanotube-enhanced interlayer attached to a fiber layer in accordance with another embodiment of the disclosure, and FIG. 4B is an enlarged, cross-sectional side view of the carbon nanotube-enhanced interlayer of FIG. 4A.

FIG. 5 is a partially cut-away, isometric view of the carbon nanotube-enhanced interlayer of FIG. 4A.

DETAILED DESCRIPTION

The following disclosure describes nanotube-enhanced interlayers for composite structures, methods for producing nanotube-enhanced interlayers, and methods for manufacturing composite parts for aircraft and other structures with nanotube-enhanced interlayers. Certain details are set forth in the following description, and in FIGS. 1A-9 to provide a thorough understanding of various embodiments of the disclosure. Other details describing well-known structures and systems often associated with composite parts and composite part manufacturing are not set forth in the following disclosure to avoid unnecessarily obscuring the description of the various embodiments.

Many of the details, dimensions, angles and other features shown in the Figures are merely illustrative of particular embodiments. Accordingly, other embodiments can have other details, dimensions, angles and features without departing from the spirit or scope of the present invention. In addition, further embodiments of the disclosure can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 310 is first introduced and discussed with reference to FIG. 3A.

Figure 1:
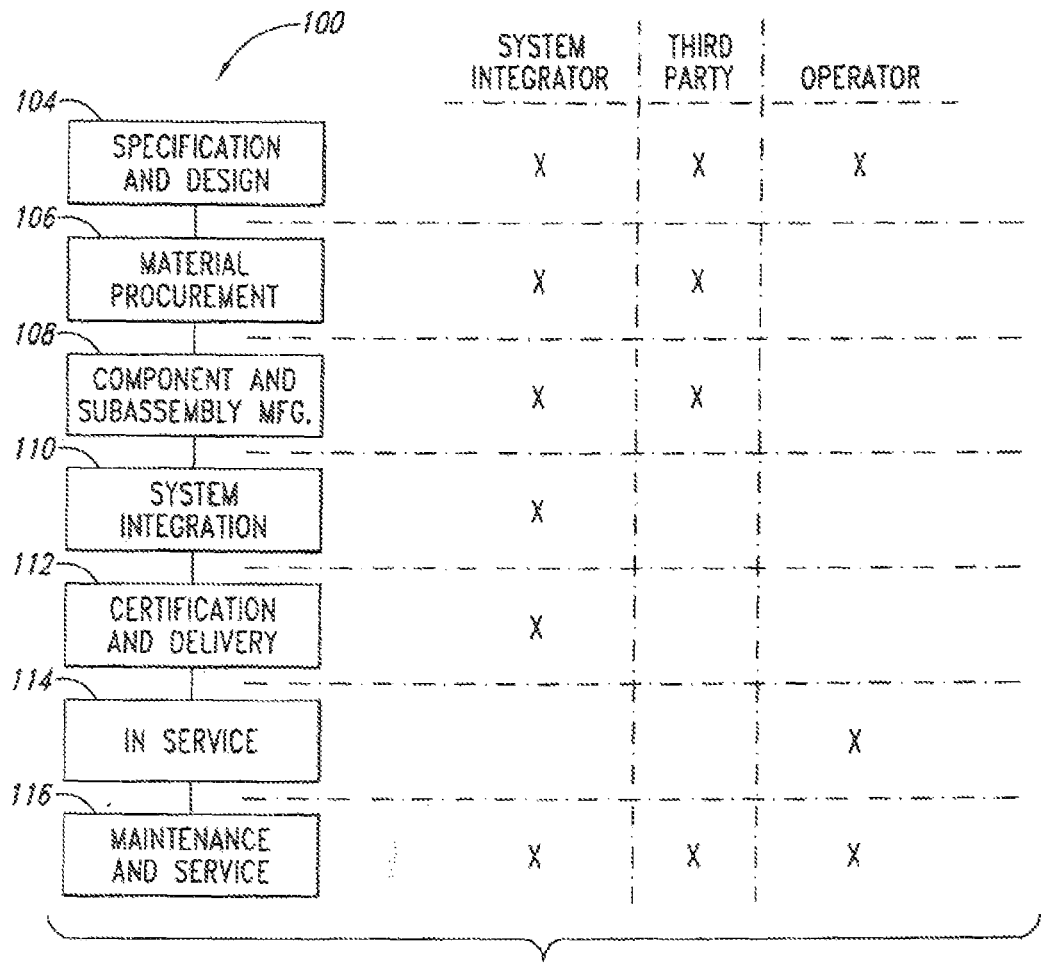
FIG. 1 is a flow diagram of aircraft production and service method.
Figure 2:
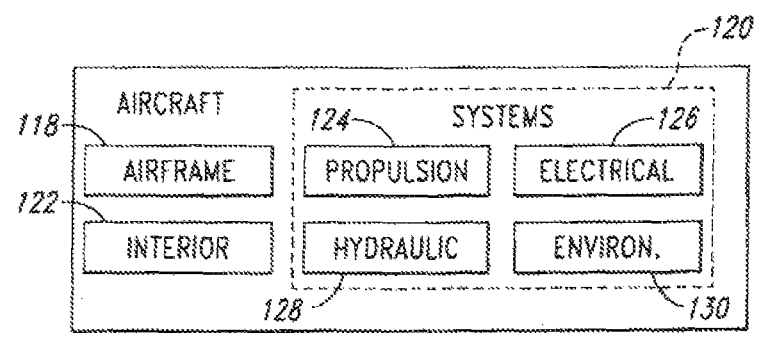
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may include modification, reconfiguration, refurbishment, and so on).

Each of the processes of method 100 may be performed or carried out by a system integrator, a third party, and/or an operator (e.g., a customer), as indicated by the "X" in the grid to the right of the flow diagram of FIG. 1. For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

FIG. 3A is a cross-sectional side view of an interlayer assembly 300 configured in accordance with an embodiment of the disclosure. In the illustrated embodiment, the interlayer assembly 300 includes an interlayer 310 attached to a fiber layer 302. The fiber layer 302 can include various types of fiber materials known in the art including unidirectional, woven, non-woven, braided, and/or warp-knit fibers of, e.g., carbon, glass, polyaramide. etc. in multiple orientations. For example, in one embodiment, the fiber layer 302 can include carbon fibers in a bi-directional weave. In another embodiment, the fiber layer 302 can include carbon fibers in a unidirectional orientation.

FIG. 3B is an enlarged, cross-sectional side view of the interlayer 310 of FIG. 3A. The interlayer 310 includes a relatively even distribution of carbon nanotubes 314 in a generally vertical orientation on a veil or substrate 312. The substrate 312 can include, without limitation, carbon fibers, glass fibers, ceramic fibers (e.g., alumina fibers) and/or other flexible materials that can withstand the relatively high temperatures often necessary for producing or "growing" carbon nanotubes. The substrate 312 can also include, without limitation, polyamide, polyimide, polyester, polybutadiene, polyurethane, polypropylene, polyetherimide, polysulfone, polyethersulfone, polyphenylsulfone, polyester-polyarylate (e.g., Vectran®), polyaramid (e.g., Kevlar®), polybenzoxazole (e.g., Zylon®), Viscose (e.g., Rayon®), etc. The substrate 312 can further include a binder (e.g., a thermoplastic resin; not shown) if necessary to maintain the substrate fibers in the proper orientation during the nanotube growing process.

The carbon nanotubes 314 can be "grown" or otherwise produced on the substrate 312 using any suitable method known in the art. Such methods can include, for example, arc discharge methods, laser ablation methods, and chemical vapor deposition (CVD) methods. Producing carbon nanotubes with CVD is essentially a two-step process consisting of catalyst preparation followed by nanotube synthesis. The catalyst can be prepared by sputtering or otherwise applying a transition metal (e.g. Fe, Cu, Ti, etc.) onto the substrate 312, and then patterning the catalyst by chemical etching or thermal annealing to induce catalyst particle nucleation. This results in catalyst cluster formation on the substrate 312 from which the carbon nanotubes 314 can grow. A gas consisting of a source of carbon (such as methane, ethelyne, or carbon monoxide), either by itself or in a mixture with other gases, is flowed over the patterned catalyst at temperatures ranging from about 650° C. to about 900° C.

After the carbon nanotubes 314 have been grown on one side of the substrate 312, a bond layer 316 can be applied to the other side of the substrate 312. The bond layer 316 can include, for example, without limitation, a melt-bondable adhesive, such as a thermosetting or thermoplastic resin (e.g., a nylon-based or polyester-based resin), or other suitable adhesive known in the art.

In the illustrated embodiment, the carbon nanotubes 314 on the substrate 312 are attached to the fiber layer 302 by bonding (e.g., by melt-bonding) the bond layer 316 to the fiber layer 302. Melt-bonding is achieved by elevating the temperature of the bond layer 316 so that the material (e.g., the thermoplastic resin) melts and thereby bonds to the fiber layer 302. Melt-bonding of interlayers to fiber layers is described in detail in U.S. patent application Ser. No. 10/428,500, which was filed on May 2, 2003, and is incorporated herein in its entirety by reference. Bonding the interlayer 310 to the fiber layer 302 in this manner can provide a relatively even distribution of the carbon nanotubes 314 over the surface of the fiber layer 302 in a generally vertical orientation.

FIG. 4A is a cross-sectional side view of an interlayer assembly 400 configured in accordance with another embodiment of the invention. The interlayer assembly 400 includes an interlayer 410 attached to a fiber layer 402. FIG. 48 is an enlarged, cross-sectional side view of the interlayer 410. As shown in FIG. 4B, the interlayer 410 includes a first plurality of carbon nanotubes 414a on a first side 413a of a substrate 412, and a second plurality of carbon nanotubes 414b on a second side 413b of the substrate 412. The substrate 412 can be at least generally similar in structure and function to the substrate 312 described above with reference to FIGS. 3A and 3B. Similarly, the first and second pluralities of carbon nanotubes 414 can be grown on the first and second sides 413a and 413b of the substrate 412, respectively, using any suitable method known in the art as explained above. The presence of the carbon nanotubes 414 on both sides of the substrate 412 may hinder bonding the interlayer 410 to the fiber layer 402. In such embodiments, the interlayer assembly 410 can be attached to the fiber layer 402 using other methods, such as stitching, tackfying and/or other forms of structural or mechanical fastening, as described in greater detail below with reference to FIG. 5.

FIG. 5 is a partially cut-away isometric view of the interlayer assembly 400 of FIG. 4A. In the illustrated embodiment, the interlayer 410 is stitched (e.g., knit-stitched or sewed) to the fiber layer 402 with thread 520. The thread 520 extends through the interlayer 410 and the fiber layer 402. The stitching can be in various patterns, densities, and/or stitch-lengths depending on the nature of the fiber layer 402, the interlayer 410, the thread 520, etc. For example, in the illustrated embodiment, the thread 520 forms a tricot stitch. In other embodiments, however, other stitch patterns can be used including, for example, without limitation, a lock stitch, a chain stitch, etc. The thread 520 can be selected from a variety of suitable materials in various thicknesses including, for example, without limitation, polyester-polyarylate (e.g., Vectran®), polyaramid (e.g., Kevlar®), polybenzoxazole (e.g., Zylon®), Viscose (e.g., Rayon®), acrylic, polyamid, carbon, fiberglass, etc. The knitting or sewing step can be manually or automatically carried out prior to use of the interlayer assembly 400 in a preform, or after the initial layup of the fiber layer 402 in a preform. Various methods for stitching the interlayer 410 to the fiber layer 402 are described in detail in U.S. patent application Ser. No. 10/974,426, which was filed on Oct. 27, 2004, and is incorporated herein in its entirety by reference. Although the interlayer 410 is stitched to the fiber layer 402 with thread 520 in FIG. 5, in other embodiments, the interlayer 410 can be attached to the fiber layer 402 with other types of fasteners. For example, in another embodiment, the interlayer 410 can be attached to the fiber layer 402 with mechanical fasteners, such as, without limitation, plastic rivets, inserts, staples, etc.

Figure 6A:
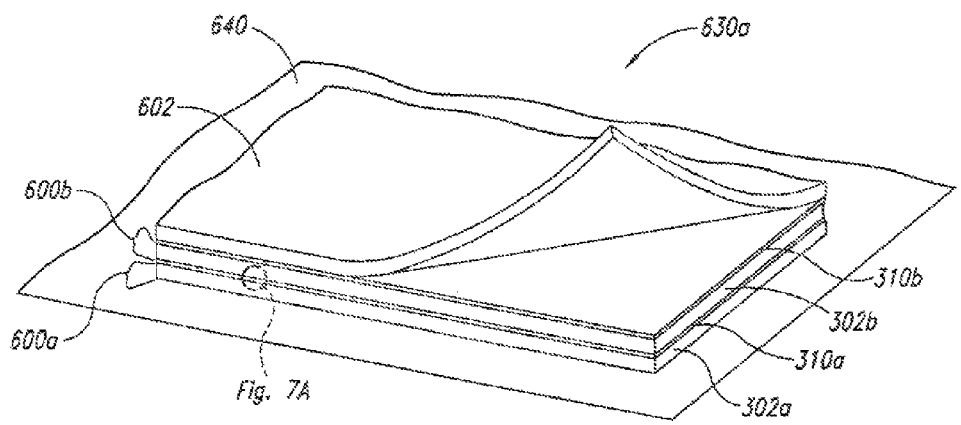
FIG. 6A is an isometric view of a first composite laminate having a first carbon nanotube-enhanced interlayer configured in accordance with an embodiment of the disclosure.
Figure 6B:
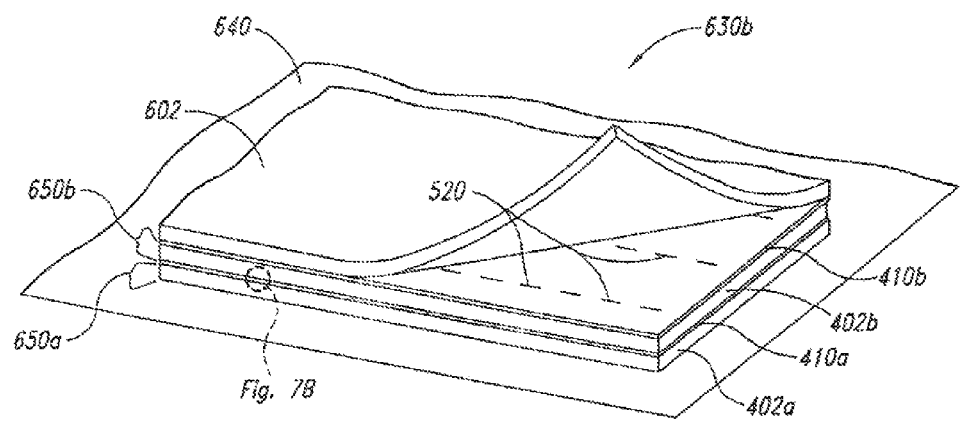
FIG. 6B is an isometric view of a second composite laminate having a second carbon nanotube-enhanced interlayer configured in accordance with another embodiment of the disclosure.

FIG. 6A is an isometric view of a first composite laminate 630a configured in accordance with an embodiment of the disclosure, and FIG. 6B is an isometric view of a second composite laminate 630b configured in accordance with another embodiment. Referring first to FIG. 6A, the first composite laminate 630a includes a plurality of interlayer assemblies 600 (identified individually as a first interlayer assembly 600a and a second interlayer assembly 600b) assembled on a mold surface 640. In the illustrated embodiment, the interlayer assemblies 600 are at least generally similar in structure and function to the interlayer assembly 300 described above with reference to FIGS. 3A and 3B. More specifically, each of the interlayer assemblies 600 includes an interlayer 310 (identified individually as a first interlayer 310a and a second interlayer 310b) melt-bonded or otherwise attached to a corresponding fiber layer 302 (identified individually as a first fiber layer 302a and a second fiber layer 302b). The interlayer assemblies 600 are stacked so that they form an alternating fiber layer/interlayer/fiber layer arrangement. A third fiber layer 602a can be placed over the second interlayer assembly 600b.

Although three fiber layers and two interlayers are shown in FIG. 6A for purposes of illustration, any number of interlayers and fiber layers in various orientations (e.g., a +45/0/−45/90 orientation) can be used in accordance with the disclosure. For example, various embodiments can include three or more fiber layers with a corresponding nanotube enhanced interlayer between each fiber layer and/or on the outside of the lay-up. In addition, the various interlayers and fiber layers can have different thicknesses, different material compositions, etc.

Once the desired number of the interlayer assemblies 600 and the fiber layer 602a has been assembled on the mold surface 640 in the desired orientations, the first composite laminate 630a can be formed into a finished composite part using a variety of liquid-molding processes known in the art. Such methods include, for example, vacuum-assisted resin transfer molding (VARTM). In VARTM, a vacuum bag is placed over the preform, and resin is infused into the preform using a vacuum-generated pressure differential. The laminate can then be placed in an autoclave, oven, etc. and heated to cure the resin. Other liquid-molding processes include resin transfer molding (RTM) and resin film infusion (RFI). In RTM, resin is infused under pressure into the preform in a closed mold. In RFI, a semi-solid resin is placed underneath or on top of the preform, and a tool is positioned on top of the laminate. The laminate assembly is then vacuum-bagged and placed in an autoclave to melt the semi-solid resin, causing it to infuse into the preform.

In another embodiment, the interlayer assemblies 600 and/or the third fiber layer 602 can be impregnated with resin (i.e., "prepreg") before being placed on the mold surface 640. The part can then be cured by placing the laminate under a vacuum-bag and curing the matrix material at an elevated temperature and/or pressure. As the foregoing examples illustrate, embodiments are not limited to a particular liquid-molding process, or to liquid-molding, for that matter.

Referring next to FIG. 6B, the second composite laminate 630b includes a plurality of interlayer assemblies 650 (identified individually as a first interlayer assembly 650a and a second interlayer assembly 650b) in a stacked arrangement on the mold surface 640. In the illustrated embodiment, the interlayer assemblies 650 are at least generally similar in structure and function to the interlayer assembly 400 described above with reference to FIGS. 4A and 4B. For example, each of the interlayer assemblies 650 includes an interlayer 410 (identified individually as a first interlayer 410a and a second interlayer 410b) stitched or otherwise fastened to a corresponding fiber layer 402 (identified individually as a first fiber layer assembly 402a and a second fiber layer 402b) with the thread 520. The interlayer assemblies 650 are stacked so that they form an alternating fiber layer/interlayer/fiber layer arrangement. A third fiber layer 602b can be placed over the second interlayer assembly 650b. Although three fiber layers and two interlayers are shown in FIG. 6B for purposes of illustration, any number of interlayers and fiber layers can be used in various orientations (e.g., a 0/90/0 orientation) in accordance with the present disclosure. In addition, the various interlayers and fiber layers can have different thicknesses, different material compositions, etc.

Once the desired number of the interlayer assemblies 650 and the fiber layer 602b has been assembled on the mold surface 640, the second composite laminate 630b can be formed into a finished part using a variety of liquid-molding processes known in the art. As described above with reference to FIG. 6B, such methods can include, for example, vacuum-assisted resin transfer molding (VARTM), resin transfer molding (RTM), and resin film infusion (RFI). In another embodiment, the interlayer assemblies 650 and/or the third fiber layer 602b can be infused with resin in prepreg form before being placed on the mold surface 640. Whether liquid-molding or prepreg methods are used, the second composite laminate 630b can be compacted (debulked) using vacuum pressure and then hardened by elevating the temperature and curing the matrix material.

Figure 7A:
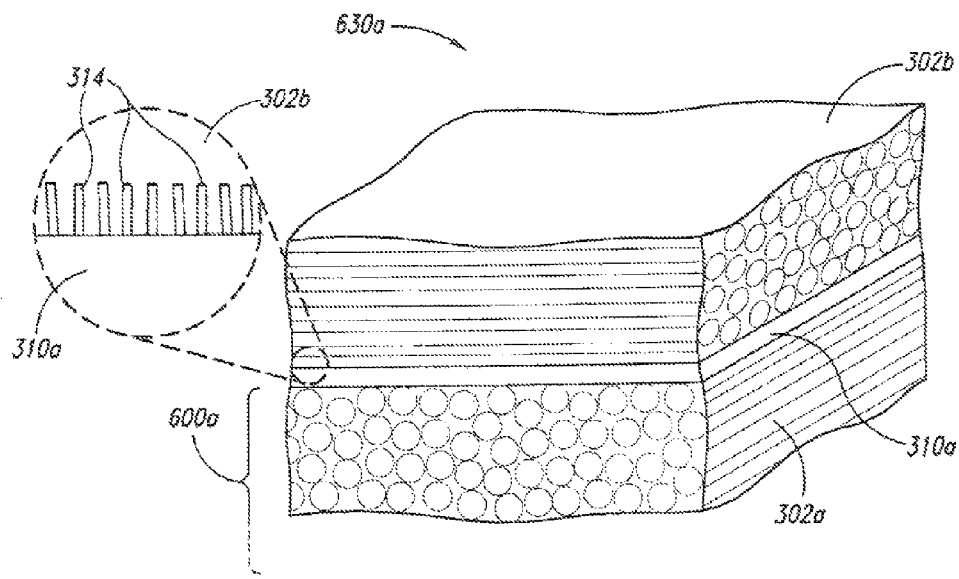
FIG. 7A is an enlarged, cross-sectional isometric view of a portion of the first composite laminate of FIG. 6A.
Figure 7B:
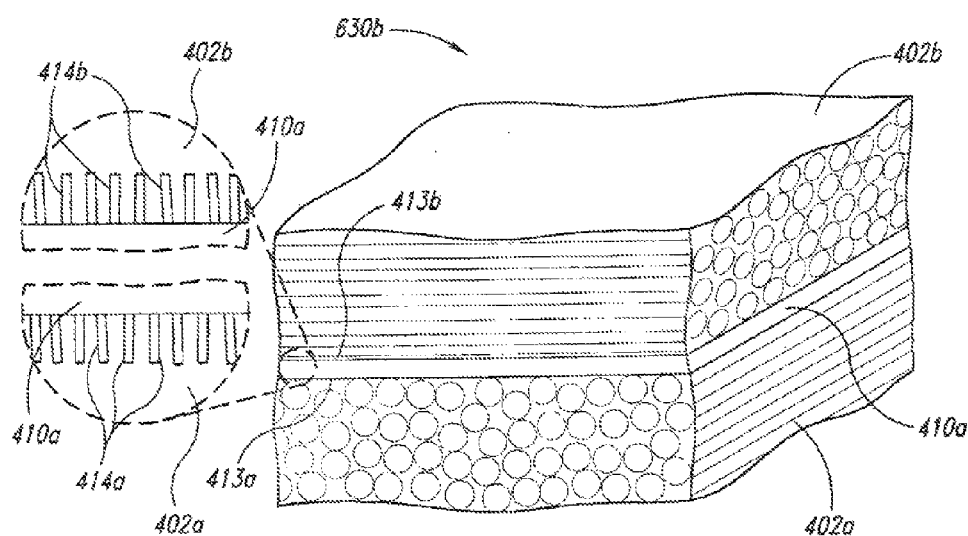
FIG. 7B is an enlarged, cross-sectional isometric view of a portion of the second composite laminate of FIG. 6B.

FIG. 7A is an enlarged cross-sectional view of a portion of the first composite laminate 630a of FIG. 6A, and FIG. 7B is an enlarged cross-sectional view of a portion of the second composite laminate 630b of FIG. 6B. As shown in FIG. 7A, the carbon nanotubes 314 extend upwardly from the first interlayer assembly 600a and into the adjacent fiber layer 302b. This configuration can enhance the strength of the interface between the two fiber layers 302, and thereby increase the fracture toughness and impact resistance of the finished composite part.

As shown in FIG. 7B, the first plurality of carbon nanotubes 414a extend from the first side 413a of the first interlayer 410a, and the second plurality of carbon nanotubes 414b extend outwardly from the second side 413b of the first interlayer 410a. As a result, the first plurality of carbon nanotubes 414a extend into a portion of the first fiber layer 402a, and the second plurality of carbon nanotubes 414b extend into a portion of the second fiber layer 402b. The two-sided nanotube configuration illustrated in FIG. 7B may provide even more interlayer strength and fracture toughness than the single-sided nanotube arrangement of FIG. 7A.

Figure 8:
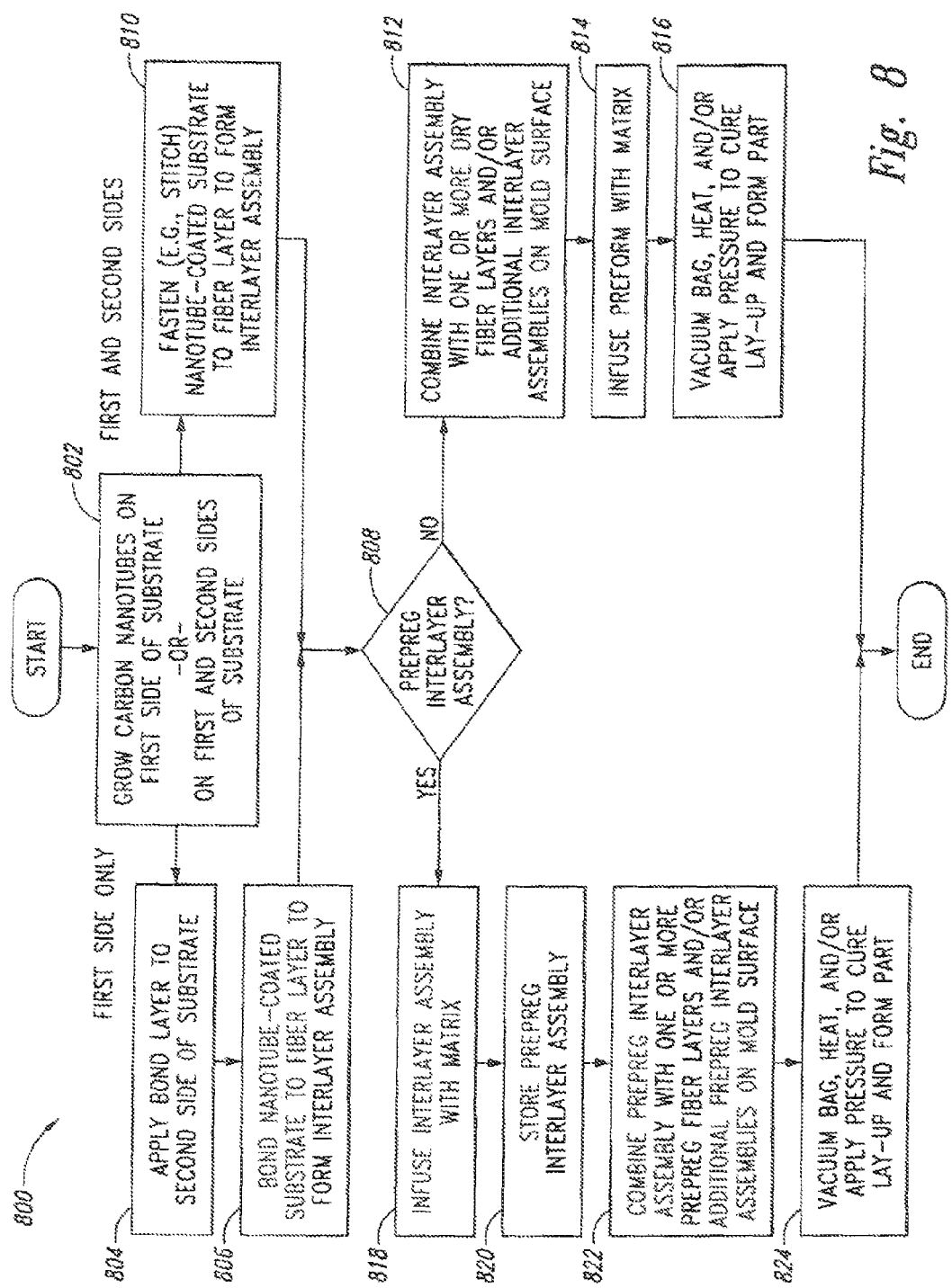
FIG. 8 is a flow diagram illustrating a method for manufacturing composite parts in accordance with an embodiment of the disclosure.

FIG. 8 is a flow diagram illustrating a method for manufacturing a composite part with a carbon nanotube interlayer assembly in accordance with an embodiment of the invention. The method begins in block 802, where carbon nanotubes are grown on a first side of a substrate or on both the first side of the substrate and a second side of the substrate. If the carbon nanotubes are grown on just the first side of the substrate, the method proceeds to block 804 and applies a bond layer (e.g., a thermoplastic bond layer, adhesive, binder, etc.) to the second side of the substrate. In block 806, the method bonds (e.g., by melt-bonding) the nanotube-coated substrate to a fiber layer to form an interlayer assembly. After block 806, the method proceeds to decision block 808.

Returning to block 802, if the carbon nanotubes are grown on both sides of the substrate, the method proceeds to block 810 and mechanically fastens (e.g., by stitching with a thread or other suitable material) the nanotube-coated substrate to a fiber layer to form an interlayer assembly. After block 810, the method proceeds to decision block 808.

In decision block 808, the decision is made whether to pre-impregnate the interlayer assembly with matrix (e.g., epoxy resin) and store the prepreg assembly for later use, or use the dry interlayer assembly in a preform. If the decision is made to pre-impregnate the interlayer assembly, the method proceeds to block 818 and infuses the interlayer assembly with matrix material (e.g., epoxy resin). Here, the interlayer assembly can be infused with uncured matrix material using any suitable method known in the art for preparing prepreg fiber layers. In block 820, the prepreg interlayer assembly can be stored, if desired, for an extended period of time prior to use. When the prepreg interlayer assembly is ready for use, the method proceeds to block 822 and combines the prepreg interlayer assembly with one or more prepreg fiber layers and/or one or more additional prepreg interlayer assemblies on a mold surface in a desired orientation. In block 824, the method vacuum-bags the prepreg assembly to compact the lay-up, and cures the assembly with the application of heat and/or pressure to harden composite part. After block 824, the method ends.

Figure 9:
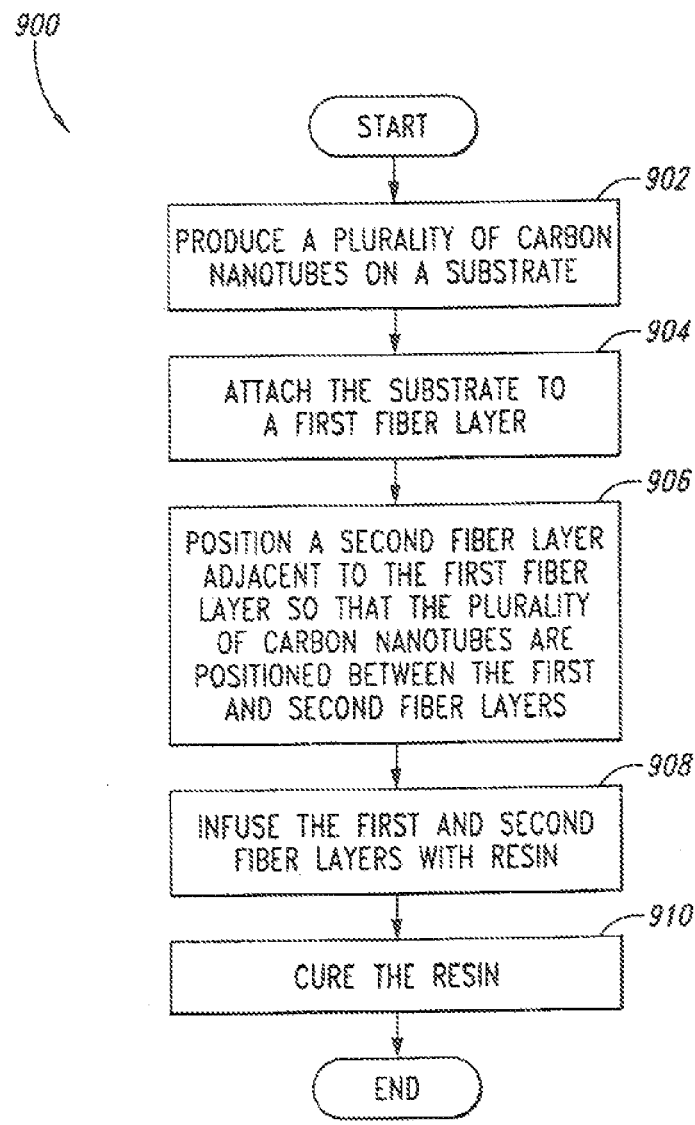
FIG. 9 is a flow diagram illustrating a method of manufacturing a composite structure in accordance with another embodiment of the disclosure.

FIG. 9 is a flow diagram illustrating a method 900 for manufacturing a composite structure in accordance with another embodiment of the disclosure. In block 902, the method includes producing a plurality of carbon nanotubes on a substrate. In block 904, the method involves attaching the substrate to a first fiber layer. In block 906, a second fiber layer is positioned adjacent to the first fiber layer so that the plurality of carbon nanotubes are positioned between the first and second fiber layers. In block 908, the first and second fiber layers are infused with resin, and the resin is cured in block 910. After block 910 the method ends.

Returning to decision block 808, if the decision is made to assemble the dry interlayer assembly into a preform, the method proceeds to block 812 and combines the interlayer assembly with one or more fiber layers and/or one or more additional interlayer assemblies on the mold surface. In block 814, the method infuses the preform with matrix material using any suitable liquid-molding process known in the art. In block 816, the method evacuates the resin-infused assembly to remove air bubbles, and then cures the assembly with the application of heat and/or pressure to form the finished composite part. After block 816, the method ends.

The methods described above can be used to manufacture composite parts for a wide variety of different structures, including aircraft structures. For example, these methods can be used to form aircraft skins, frames, stiffeners, and/or various portions thereof. The composite parts can be assembled together to form aircraft structures (e.g., fuselages, wings, tail surfaces, etc.) using adhesives, fasteners, and/or other suitable attachment methods known in the art.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A method of manufacturing a composite structure, the method comprising:
    forming a bond-line interlayer by growing a plurality of carbon nanotubes on a thin layer composed of a first material;
    after growing the plurality of carbon nanotubes on the thin layer of first material, positioning the bond-line interlayer on a first fiber layer, wherein the first fiber layer is composed of a second material, different than the first material;
    positioning a second fiber layer on the bond-line interlayer, whereby the bond-line interlayer is positioned between the first fiber layer and the second fiber layer;
    infusing at least the first and second fiber layers with resin; and
    curing the resin to harden the composite structure.

2. The method of claim 1 wherein the thin layer of first material is comprised of a flexible, non-woven substrate, and wherein the first and second fiber layers are comprised of woven fiber layers.

3. The method of claim 1 wherein the thin layer of first material is comprised of a non-woven polymer sheet, and wherein the first and second fiber layers are comprised of woven fiber layers.

4. The method of claim 1 wherein the thin layer of first material is comprised of a non-woven synthetic polymer sheet.

5. The method of claim 1 wherein the thin layer of first material is comprised of thermoplastic.

6. The method of claim 1 wherein the thin layer of first material is comprised of a synthetic resin.

7. The method of claim 1 wherein the thin layer of first material is comprised of carbon fibers.

8. The method of claim 1 wherein thin layer of first material has a first side opposite a second side, and wherein growing a plurality of carbon nanotubes comprises growing a plurality of carbon nanotubes on the first side and the second side of the thin layer.

9. The method of claim 1, further comprising attaching the bond-line interlayer to the first fiber layer before positioning the second fiber layer on the bond-line interlayer.

10. The method of claim 1, further comprising melt-bonding the bond-line interlayer to the first fiber layer before positioning the second fiber layer on the bond-line interlayer.

11. The method of claim 1, further comprising mechanically fastening the bond-line interlayer to the first fiber layer before positioning the second fiber layer on the bond-line interlayer.

12. The method of claim 1 wherein growing a plurality of carbon nanotubes on the thin layer of first material includes growing the plurality of carbon nanotubes on one side of the thin layer, and wherein the method further comprises, after growing the plurality of carbon nanotubes on the one side of the thin layer, applying a bond layer to an opposite side of the thin layer.

13. The method of claim 1 wherein growing a plurality of carbon nanotubes on the thin layer of first material includes growing the plurality of carbon nanotubes on one side of the thin layer, and wherein the method further comprises, after growing the plurality of carbon nanotubes on the one side of the thin layer, applying a melt-bondable adhesive bond layer to an opposite side of the thin layer.

14. The method of claim 1 wherein the bond-line interlayer includes a bond-layer, and wherein the method further comprises heating the bond-layer and the first fiber layer to melt-bond the bond-line interlayer to the first fiber layer.

15. The method of claim 1 wherein infusing at least the first and second fiber layers with resin includes preimpregnating the bond-line interlayer and the first fiber layer with a first portion of resin, and preimpregnating the second fiber layer with a second portion of resin, before positioning the second fiber layer on the bond-line interlayer.

16. The method of claim 1 wherein the composite structure is a composite aircraft structure, and wherein the method further comprises assembling the hardened composite structure into a portion of an aircraft.

17. A method of manufacturing a composite structure, the method comprising:
    providing a first woven fiber layer;
    providing a second woven fiber layer;
    producing a plurality of carbon nanotubes on a flexible substrate separate from the first and second woven fiber layers, wherein the flexible substrate is composed of material that is different than the first and second woven fiber layers;
    after producing the plurality of carbon nanotubes on the flexible substrate:
        attaching the flexible substrate to the first woven fiber layer; and
        positioning the second woven fiber layer on the flexible substrate; and
    infusing at least the first and second fiber layers with resin.

18. The method of claim 17 wherein the flexible substrate is composed of a non-woven material that is different than the first and second woven fiber layers.

19. The method of claim 17, further comprising curing the resin to harden the composite structure.

* * * * *